United States Patent
Dolan et al.

(10) Patent No.: US 8,626,632 B1
(45) Date of Patent: Jan. 7, 2014

(54) SYSTEM AND METHOD FOR MARGIN LOAN SECURITIZATION

(75) Inventors: Carrie Dolan, Orinda, CA (US); Gregg Dolin, Martinez, CA (US); Cassandra Seay, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 13/356,883

(22) Filed: Jan. 24, 2012

Related U.S. Application Data

(63) Continuation of application No. 12/958,343, filed on Dec. 1, 2010, now Pat. No. 8,126,798, which is a continuation of application No. 10/273,968, filed on Oct. 18, 2002, now Pat. No. 7,873,556.

(60) Provisional application No. 60/339,474, filed on Oct. 26, 2001.

(51) Int. Cl.
*G06Q 40/00* (2012.01)

(52) U.S. Cl.
USPC ........ 705/36; 705/37; 705/35; 705/4; 705/39; 705/40; 235/379

(58) Field of Classification Search
USPC .................................... 705/35-374; 235/379
See application file for complete search history.

(56) References Cited

U.S. PATENT DOCUMENTS

| | | | |
|---|---|---|---|
| 4,774,664 A | 9/1988 | Campbell et al. | |
| 5,802,501 A | 9/1998 | Graff | |
| 5,940,809 A | 8/1999 | Musmanno et al. | |
| 5,966,700 A | 10/1999 | Gould et al. | |
| 5,987,435 A | 11/1999 | Weiss et al. | |
| 6,014,643 A | 1/2000 | Minton | |
| 6,192,347 B1 | 2/2001 | Graff | |
| 6,233,566 B1 | 5/2001 | Levine et al. | |
| 6,243,688 B1 | 6/2001 | Kalina | |
| 6,513,019 B2 | 1/2003 | Lewis | |
| 6,654,727 B2 | 11/2003 | Tilton | |
| 7,117,172 B1 | 10/2006 | Black | |
| 7,139,730 B1 * | 11/2006 | Shimko et al. | 705/35 |

(Continued)

OTHER PUBLICATIONS

AssociationInteraction of Financial and Regulatory InnovationAuthor(s): Edward J. Kane; Reviewed work(s):Source: The American Economic Review, vol. 78, No. 2, Papers and Proceedings of the One-Hundredth Annual Meeting of the American Economic Association (May 1988), pp. 328-334.*

(Continued)

*Primary Examiner* — Harish T Dass
(74) *Attorney, Agent, or Firm* — Kilpatrick Townsend & Stockton LLP

(57) ABSTRACT

A system and method for securitizing margin loans, wherein a processor system operates to analyze account data for a plurality of accounts, and to identify and flag accounts that are marginable. The process provides for flagging a group of accounts which collectively are representative of a portfolio of marginable accounts held by a brokerage company. The system and method also provides for generating a general ledger for the brokerage company, a SPV, and a trust, wherein these general ledgers track the sale of margin loans belonging to the flagged accounts, from the brokerage company to the trust via the SPV. The system and method further provide for processing transactions in the flagged accounts to identify and classify transactions in the flagged accounts which affect the margin balances for the flagged accounts.

14 Claims, 6 Drawing Sheets

(56) References Cited

U.S. PATENT DOCUMENTS

| | | | | |
|---|---|---|---|---|
| 7,184,981 B2* | 2/2007 | Olin | ............................ | 705/36 R |
| 2002/0095361 A1 | 7/2002 | Trenk et al. | | |
| 2003/0167219 A1 | 9/2003 | Quraishi et al. | | |
| 2004/0181493 A1 | 9/2004 | Cross et al. | | |

OTHER PUBLICATIONS

Java Financial Calculators, from KJE Computer Solutions and Dinkytown.net, retrieved from http://web.archive.org/web/19991116110320/dinkytown.net/java/SimpleLoan.html, on Nov. 28, 2006, 2 pages.

SocGen Asian Securitisation Pty Lrd, Societe Generale Asia Ltd., "Asia—time to consider securitization," Asiamoney: Capital Raising Guide, Sep. 1997, 5 pages, retrieved Jul. 31, 2007, from ABI/INFORM Global Database, http://proquest.umi.com/pqdweb?did=18147557&sid=4&5mt=3&clientid=1964&RQT=309&VName=PQD, document ID: 18147557.

Tempkin, Adam. "Margin-loan ABS to be Issued as Privates." Private Placement Letter, Accounting & Tax Periodicals, ProQuest, May 21 2001, 3 pages.

U.S. Appl. No. 10/273,968, filed Oct. 18, 2002, Final Office Action dated Aug. 9, 2007, 25 pages.

U.S. Appl. No. 10/273,968, filed Oct. 18, 2002, Office Action dated Feb. 4, 2009, 27 pages.

U.S. Appl. No. 10/273,968, filed Oct. 18, 2002, Office Action dated Apr. 22, 2010, 7 pages.

U.S. Appl. No. 10/273,968, filed Oct. 18, 2002, Office Action dated Aug. 10, 2009, 20 pages.

U.S. Appl. No. 10/273,968, filed Oct. 18, 2002, Office Action dated Aug. 31, 2009, 19 pages.

* cited by examiner

SYSTEM AND METHOD FOR MARGIN LOAN SECURITIZATION

RELATED APPLICATIONS

This application is a continuation of U.S. patent application Ser. No. 12/958,343, filed on Dec. 1, 2010 entitled "System and Method for Margin Loan Securitization," which is a continuation of U.S. patent application Ser. No. 10/273,968, filed Oct. 18, 2002 entitled "System and Method for Margin Loan Securitization," which claims the benefit of U.S. Provisional Application Ser. No. 60/339,474, filed Oct. 26, 2001, the entire contents of which are incorporated herein by reference for all purposes.

TECHNICAL FIELD

The present invention relates to a computer system and method for a securitization of margin loans.

BACKGROUND

Stock Brokerage companies are companies which, among other things, hold customer brokerage accounts. Customers can instruct the brokerage company to buy and sell securities held in their brokerage accounts. In some cases the customers will also choose to take a loan from the brokerage company, where the loan can be used to purchase securities held in the customer's brokerage account. The loan is secured by the securities held in the customers brokerage account. These loans which are secured by the securities held in the customers brokerage account are referred to as "margin loans".

The margin loan is extended to the customer pursuant to a margin loan agreement which provides among other things that the customer will pay a specified rate of interest on the margin loan. Aspects of the administration of the securities and lending activity for margin loans are governed by Fed Regulation T and NYSE rule 431. Among other things these regulations require that customers equity in the brokerage account which is the subject of the margin loan must exceed the value of the margin by specified amount. Thus, the stock brokerage company should be protected from the prospect of the falling stock prices causing the customer to be unable to repay an outstanding margin loan. In situations where the value of securities in the customer's brokerage account drops below a specified amount relative to an outstanding margin loan, the brokerage company will issue a margin call to the customer. In response to a margin call the customer must either increase the equity of the brokerage account by either depositing additional cash or securities into the brokerage account which is subject the margin call, or the customer can sell securities held in the brokerage account, and proceeds from the sale of the securities can be used to pay down the amount of the margin loan. In some cases where the customer does not respond in a timely manner to a margin call, the brokerage company may take the initiative and sell certain securities in the brokerage account to reduce the amount of the outstanding margin loan.

Brokerage companies enjoy several benefits from extending margin loans to customers. For example, brokerage companies can earn substantial income from the receivables (i.e., the interest payments on the margin loans). Brokerage companies can also benefit from the additional transactions and customer activity that results from a customer's ability to obtain margin loans. Extending margin loans can also have some drawbacks for brokerage companies. One disadvantage of margin loans is that the lending of cash to customers reduces the cash reserves for the brokerage company. Further, in an extremely volatile market the brokerage company is also subjected to the risk that rapidly falling stock prices could make it difficult for the brokerage company to recover the full amount of a margin loan for an account where a customer is not able it meet a margin call. One widely used method for addressing situations where the owner of an asset would like to create funding and reduce their risk with respect to the asset is to securitize the asset. Thus, given the historical use of securitizing assets, one obvious solution for a brokerage company would be to use the structure shown in FIG. 1 to securitize margin loans.

The diagram in FIG. 1 shows a securitization process for margin loans, such a securitization process is a typical approach used in the past to securitize as an asset. Provided herein is a discussion of the diagram describing margin loan securitization relative to the complex regulatory and business environment which relates to the brokerage industry in general and to margin loans in particular. As shown in FIG. 1 a customer 102 receives a margin loan 104 from brokerage company (shown as Broker/Dealer). In return for the margin loan the customer transfers 106 a security interest in securities held in the customer's brokerage account and assumes an obligation to pay interest, or receivables, on the margin loan.

As shown in FIG. 1, margin loans originate at the brokerage company, which is a registered broker-dealer and member of the National Association of Securities Dealers. After making the margin loan, the brokerage company can sell the margin loans and assign the security interest in the securities collateralizing the margin loans, to a special purpose vehicle ("SPV") on settlement date pursuant to a "Receivables Purchase Agreement". As shown in FIG. 1, the selling of the receivables (the margin loans) and the assigning of the security interest are at 108, and the payment 110 from the SPV to the brokerage company are at 110.

The SPV will be a wholly owned subsidiary of the brokerage company. The SPV can be capitalized by the brokerage company, or depending on the structure of various entities related to the brokerage company, might also be capitalized by another entity which owns or is affiliated with the brokerage company.

Broker-Dealer Registration: Exchange Act section 3(a)(4) defines the term "broker" to include any person engaged in the business of effecting transactions for the account of others. Exchange Act section 3(a)(5) defines "dealer" to include any person engaged in the business of buying and selling securities for his own account, through a broker or otherwise. Neither the SPV nor the Trust, as described below, triggers the Exchange Act's broker-dealer registration requirements since these entities would not: (i) receive compensation based upon the value or volume of transactions effected, (ii) communicate or deal with customers except through a registered broker-dealer, (iii) be involved in the negotiation of transactions, (iv) clear or settle transactions, (v) handle customer funds or securities or (vi) solicit business in securities.

The SPV's purchase of the customer receivables 108 and 110 will be funded in part by a liquidity facility provided by an entity 114 which owns or is affiliated with the brokerage company. In exchange for this funding 112, the SPV will provide a promissory note 116 to the entity 114.

The SPV transfers 118 the margin loans and assigns the security interest in the securities collateralizing the margin loans, to a business trust (the "Trust") 120 pursuant to a pooling and servicing agreement ("Pooling and Servicing Agreement") between the Trust, the SPV and brokerage company. The payment 122 to the SPV for the transfer of the customer receivables to the Trust is financed by the Trust's issuance of business trust certificates 124. These business trust certificates 124 will be issued to third parties ("Series Certificates"). In addition, the SPV will likely retain an interest in the Trust and its interest will be reflected through the issuance of a business trust certificate 124 ("Transferor Certificate"). Both types of business trust certificates evidence an undivided ownership interest in the assets of the Trust (i.e., cash and customer receivables). The transactions between all entities and the issuance of funding occur simultaneously (i.e., the same day).

Funding for the purchase of the customer receivables from the Trust will be accomplished by issuing commercial paper (CP) and/or notes to the capital markets. CP can be issued in exchange for payment 129 from an existing commercial paper conduit. The conduit will purchase 116 a Series Certificate 124 from the Trust and in turn issue CP 128 secured by the Series Certificate. Alternatively or in addition, notes 130 can be issued to term capital market investors 132 in return for payment 133 through an Owner Trust 134. The Owner Trust will pay 136 for a Series Certificate 124 and issue notes 130 secured by the Series Certificate 124 to fund its purchase. The Series Certificates will receive a rating of at least investment grade or the equivalent by each one or more nationally recognized rating agencies. The ratings of the Series Certificates would not be dependent upon the ratings assigned to any obligations of the broker-dealer. The funding strategy can depend on the amount and expected duration of margin loans sold. The transaction size will depend on brokerage company's liquidity needs at the time of issuance.

This two-step sale structure will isolate the assets of the brokerage company through a true sale and remove the assets related to the margin loan from brokerage company's consolidated GAAP financial statements. The Trust will not have recourse to brokerage company for margin loan losses. The sale of the Receivables by the brokerage company to the SPV would be treated as a sale for commercial law, bankruptcy, and accounting purposes. The structure does not require that future receivables generated by a customer account whose existing receivables have been sold to the Trust be automatically sold to the Trust.

The SPV and the Trust will be deemed Regulation T lenders under the Federal Reserve regulations. This designation occurs because both the SPV and the Trust will, respectively, be deemed to be directly and indirectly controlled by the brokerage company. Customers whose debits have been sold will remain subject to Regulation T.

Pursuant to the Pooling and Servicing Agreement, the broker-dealer would agree to act as servicer of the Receivables ("Servicer"). The Receivables sold to the Trust would be serviced in accordance with customary commercial servicing standards by the broker-dealer. As the Servicer, the broker-dealer would hold all of the documents relating to the Receivables. The transaction documents would require that all payments on the Receivables be remitted by the obligors directly to a segregated trust account. The trust would pay a periodic fee to the broker-dealer for its services as the Servicer.

As shown in FIG. 1 the brokerage company will assign to the SPV the 108 security interest granted by the customer to brokerage company, and the SPV will transfer the 118 assigned security interest to the Trust. The brokerage company is not granting to either the SPV or the Trust a lien on or security interest in the customer securities. Rather, the brokerage company is transferring the assigned security interest granted to it by the customer. This is a securitization process, and not a traditional rehypothecation bank loan transaction whereby the brokerage company would grant a lien on customer securities to the lendor which would serve as collateral for the loan to the brokerage company.

In the securitization structure a lien granted by a customer on its securities to the brokerage company is transferred by the brokerage company to a third party, and will continue to secure credit extended to the customer and does not serve to secure credit extended to the brokerage company.

In operation of the above described securitization process it is helpful to consider aspects of agreements and regulatory requirements that come into play. Some of these agreements and regulatory issues are discussed below.

Intercreditor Agreement

Although the security interest securing the margin loan has been assigned to the SPV and the Trust, the customer agreement is still effective to create a separate security interest to secure all obligations owed to the brokerage company that have not been sold to the SPV. Because of this possibility of multiple security interests, the brokerage company, the SPV, and the Trust would enter into an intercreditor agreement that provides that the various security interests granted by the customer have the same priority and share in the collateral on a pari passu basis (based on the value of the obligation owed to each entity).

Custody of Customer Securities.

SEC Rule 15c3-3 (i) requires broker-dealers to obtain promptly and thereafter maintain the physical possession or control of all fully-paid and excess-margin securities and (ii) establishes customer-reserve requirements based on a formula contained in rule 15c3-3. To the extent that the brokerage company sells, and therefore no longer holds, a margin loan in a customer account, the brokerage company will continue to hold the securities on behalf of the customer. Neither the SPV nor the Trust will ever hold customer funds or securities. The brokerage company is only selling an asset (its right to re-payment of the margin loan it extended to its customer). The brokerage company is not transferring or selling the customer securities.

The securities in accounts with sold margin loans will be deemed fully-paid securities, as that term is used in SEC Rule 15c3-3. Accordingly, the brokerage company would be required to reduce the customer's securities to possession or control. The brokerage company's assignment to the SPV and Trust of the security interest granted by the customer will not prevent the brokerage from reducing the customer securities to physical possession and control. All customer securities securing a sold receivable will be held in a good control location and the securities will be under the control of the brokerage company. Customer securities in accounts with sold margin loans will not be rehypothecated.

Customer Servicing

As discussed above, the brokerage company will sell the customer receivables to a SPV which will then sell to the Trust. The brokerage company is not selling or transferring the customer account and is not assigning any obligation under the customer-account agreement between the customer and the brokerage company. The brokerage company remains the account owner. The brokerage company will continue to be responsible for custody of customer funds and securities, handling and executing customer orders, clearing and settling customer transactions, providing confirmations and statements and complying with all customer-protection laws, regulations and rules. All obligations remain with the brokerage company. The Trust will establish a servicing agreement with the brokerage company for collection activities. The brokerage company, as agent for the Trust, will collect and remit cash that flows into the customer account to the Trust until the customer receivable is cleared. For example, if any of the securities in the account are liquidated or transferred, the brokerage company will be required to remit the proceeds deposited into the customer account to the SPV or the Trust.

Margin Requirements, Policies and Procedures

Pursuant to the Pooling and Servicing Agreement, the brokerage company will be primarily responsible for ensuring compliance with Fed Regulation T and NYSE Rule 431 (collectively, "Margin Regulations"). The brokerage company will maintain all books and records necessary to demonstrate compliance. Any calculation of initial or maintenance margin will be performed on a consolidated-loan basis. The brokerage company will further be required to conform to industry best practices with respect to the establishment of margin policies and procedures. Consistent with this standard, the brokerage company will continue to handle all customer margin accounts in accordance with the margin policies and procedures applicable to all customer margin accounts, without regard to the owner of the right to repayment of the margin loan. The Trust will have no authority or ability to establish specific margin policies, including without limitation: (i) requiring maintenance margin in excess of the brokerage company's maintenance-margin requirements, either on an account-by-account or security-by-security basis, (ii) demanding additional collateral to secure existing margin loans, (iii) determining interest rates or other finance charges applicable to customer margin-loans, (iv) determining the method of computing interest or outstanding debit balances, (v) denying extensions of time to meet margin requirements, or (vi) requiring sufficient collateral value be on deposit with the brokerage company on trade date. The Trust will have the right to issue entitlement orders to the brokerage company requiring the brokerage company to liquidate customer securities securing Receivables sold to the Trust, just as the brokerage company would have the such right.

NYSE Rule 328

New York Stock Exchange, Inc. (the "Exchange" or "NYSE") rule 328(a), provides that "[n]o member organization shall consummate . . . a sale or factoring arrangement with respect to any customers' debit balances without the prior written authorization of the Exchange." Thus, the brokerage company is required to request approval from the Exchange to sell customers' debit balances as part of its securitization program.

Series Certificates

Under the above structure, the Trust would issue Series Certificates either to a Note Master Trust or to institutional investors who are Qualified Institutional Buyers, as such term is defined in the Securities Act of 1933, as amended ("Securities Act"). The Series Certificate would represent an undivided interest in the Trust. The purchase of a Series Certificate, which is an equity security, whether in a private placement or public offering is not deemed to be an extension of credit for purposes of Regulation T.

Commission and SRO Oversight

NYSE rule 321.20 provides that a member's "subsidiary shall keep books and records separate and distinct from those of the member . . . and such books and records shall, upon request, be made available by the member or member organization for inspection by the Exchange." The SEC retains authority to inspect the books and records of these subsidiaries, pursuant to Exchange Act section 17(h)(1), which states that the Commission may require broker-dealers to make reports concerning the financial and securities activities of associated persons whose business activities are reasonably likely to have a material impact on the financial or operational condition of such broker-dealer. Exchange Act section 3(a)(21) defines associated person, in relevant part, as any person controlled by a broker-dealer. Both the SPV and the Trust will be deemed to be associated persons of brokerage company and their books and records available for inspection by the Commission or the NYSE.

SIPC/Bankruptcy

Customer protection from SIPC is not impacted by this transaction. The brokerage company owes the securities to its customers, just as it does when the brokerage company lends customer securities (i.e., marginable securities) or when the customer obtains credit from a third party and posts its securities as collateral. SIPC's coverage is not in any way affected simply because a third party has a security interest in those securities.

Much of the above discussion is focused on obvious securitization approaches for securitizing margin loans, and the legal and business implications that flow from such a process, but what is not obvious is how one would design a system and method to facilitate the securitization of margin loan, and the subsequent tracking and administration of such loans.

SUMMARY

The system and method of the present invention provide for the administration of a margin loan securitization program. In one embodiment a system provides for securitizing margin loans by transferring margin loans in brokerage accounts from a brokerage company.

The system includes a data warehouse for storing data for a plurality of brokerage accounts, and an account selector for analyzing the data for the plurality of brokerage accounts, and based on the analysis selects a first group of accounts as candidates for securitizing margin loans belonging to the first group of accounts. The system also includes a flag generator which analyzes the first group of accounts and flags selected accounts of the first group of accounts, wherein the flagged accounts are identified in the data warehouse. Further the embodiment includes a securitizer which operates to transfer margin loans belonging to the flagged selected accounts from a brokerage company to a trust. A transaction processor is provided which analyzes transaction data for the flagged selected accounts and identifies transactions in the flagged accounts which effect margin loans belonging to the flagged accounts. A securities segregator that which segregates securities held in flagged accounts is also provided. A general ledger operator is provided which updates a general ledger for the brokerage company, and a general ledger for the trust, to record the transfer of the margin loans to the trust, and updates the general ledger of the brokerage company. The general ledger of the trust to records the effect of any transactions in the flagged selected accounts which effect the balance of the margin loans for the flagged selected accounts.

Another embodiment of the invention provides a method for implementing a margin loan securitization program on a computer system. The method includes storing account data for a plurality of accounts in a data warehouse, and analyzing the account data in the data warehouse to identify a selected group of accounts, wherein the selected group of accounts are identified based on a defined set of criteria. The method further provides for analyzing data for the selected group of accounts and based on this analysis identifies a group of the selected accounts to be flagged, and then flagging the group of accounts in the data warehouse. Margin loans belonging to the flagged accounts are transferred to a trust. The method further includes recording the purchase of the margin loans by the trust, and analyzing transactions in the flagged accounts to identify transactions in the flagged accounts which effect a balance of a margin loans belonging to a flagged account.

Another embodiment of the invention provides a method for implementing a margin loan securitization program on a computer system which includes analyzing account data using criteria to identify a group of accounts, wherein the criteria includes requiring that an account be a marginable account. The method further includes flagging the selected accounts in a data warehouse which holds account data, and selling margin loans belonging to the selected accounts to a SPV, and selling margin loans belonging to the selected accounts from the SPV to a trust. This method includes segregating securities held in flagged accounts. This method includes recording the purchase of margin loans by the trust in a general ledger for the trust, and analyzing transactions in the flagged accounts to identify transactions in the flagged accounts which effect a balance of a margin loan belonging to flagged accounts.

DETAILED DESCRIPTION

The system and method herein provide for implementation of a margin loan securitization process, where the management of the margin loan securitization is efficiently administrated using a computer system.

Figure 1:
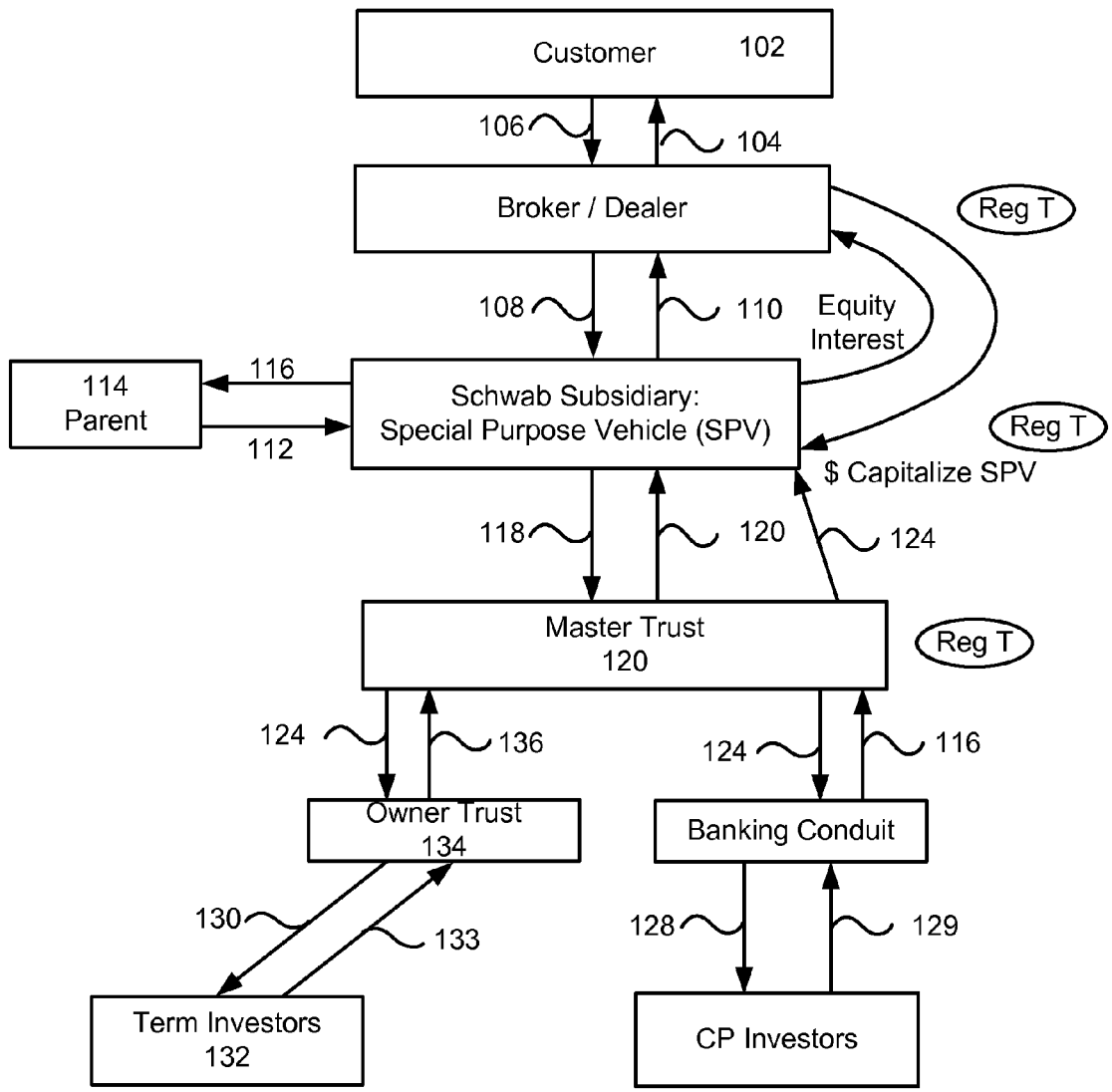
FIG. 1 is a diagram of margin loan securitization structure.
Figure 2:
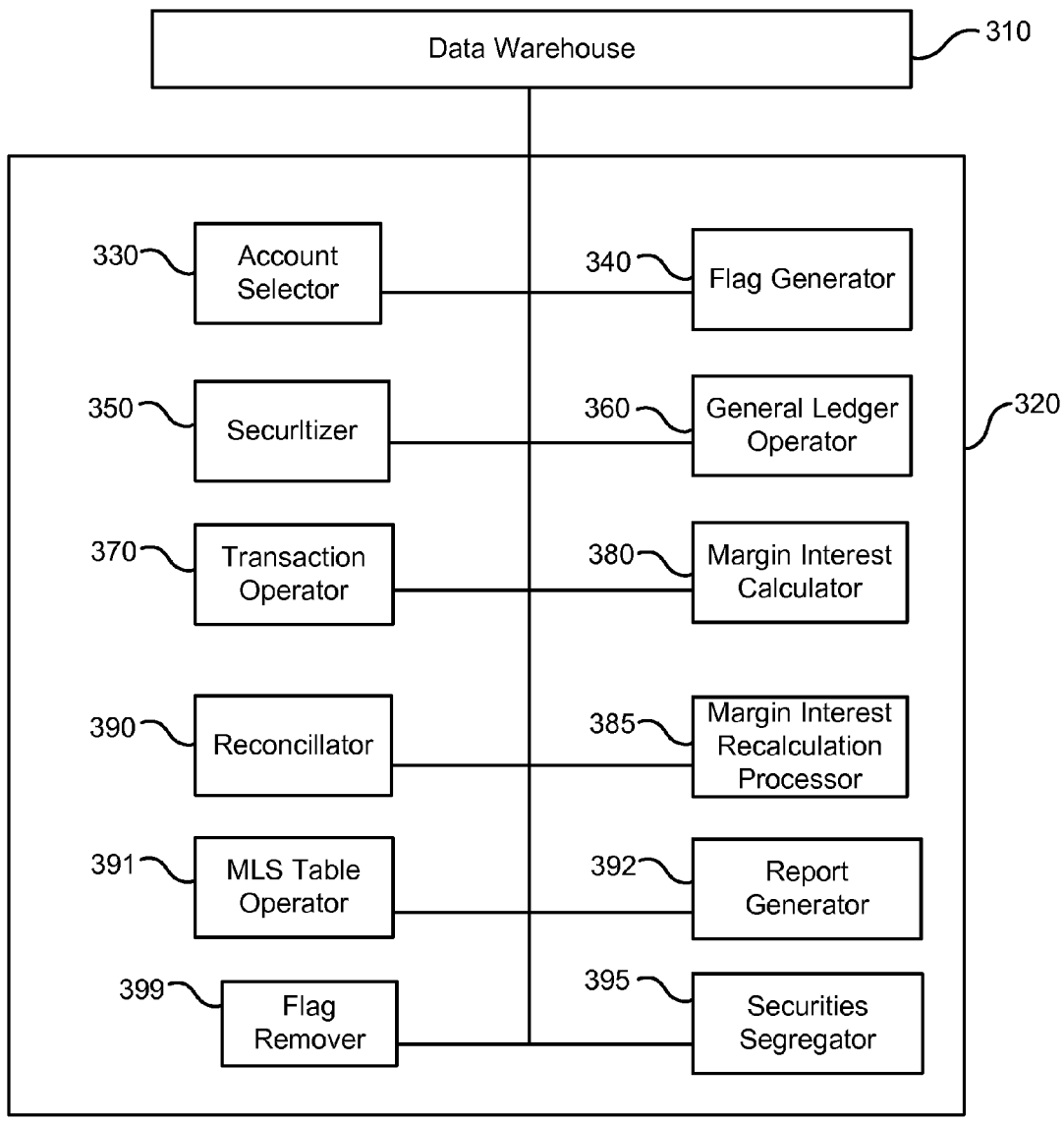
FIG. 2 is a diagram illustrating an apparatus of the present invention.
Figure 3:
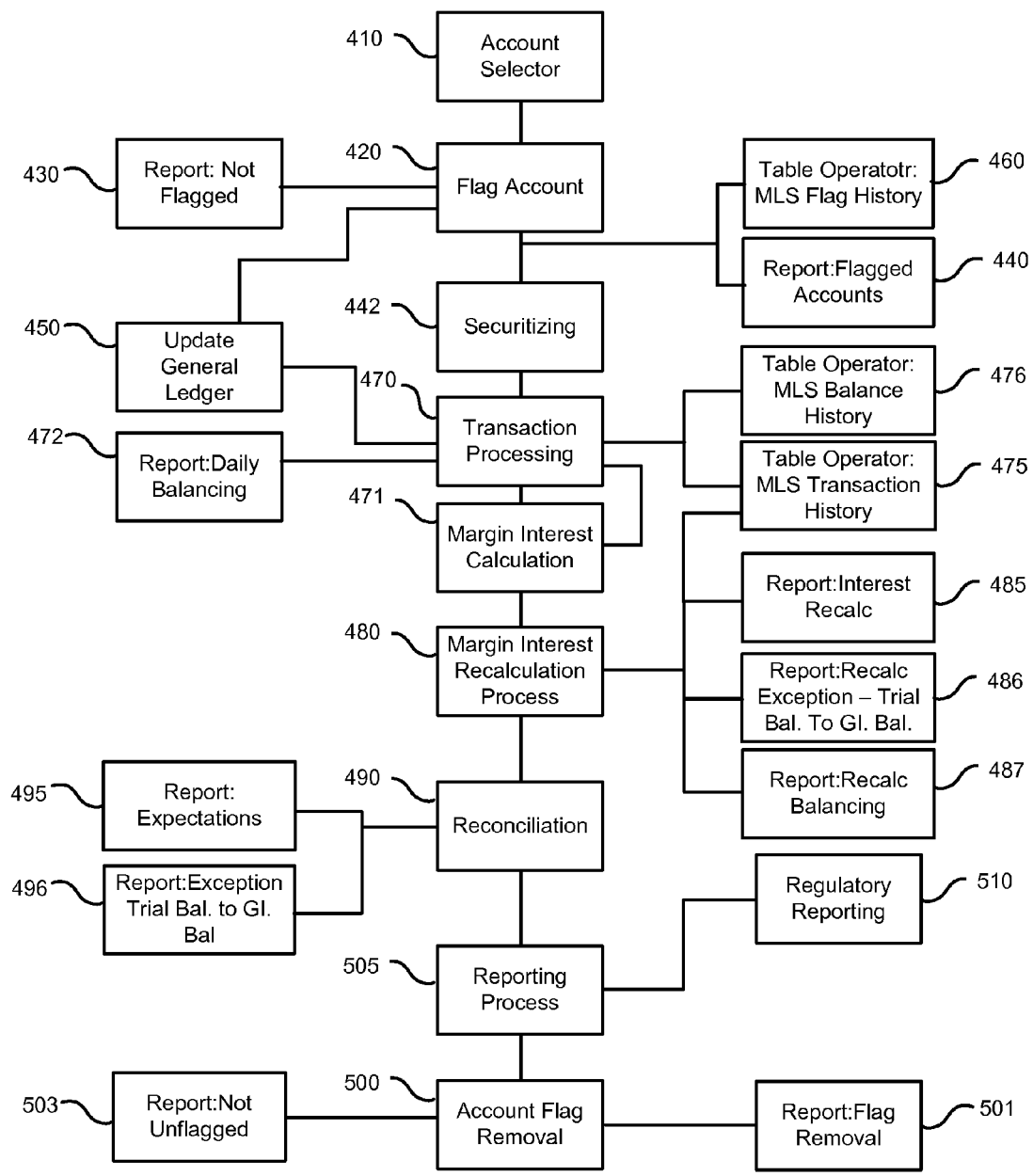
FIG. 3 is a diagram illustrating a process of the invention.

FIG. 2 shows an apparatus of an embodiment of the invention herein for implementing aspects of the method shown in FIG. 3. The apparatus 300 resides on a computer system which in most cases will include multiple computer processors networked together. As is known in the art extensive computer systems including multiple mainframes and servers can be networked together to store massive amounts of data, and to implement multiple processes using the data. In many instances mainframe computer environment such as an IBM 3390 system are utilized. One aspect of the invention includes a data warehouse 310, which includes a database system that stores data for brokerage accounts of customers of the brokerage company. The data warehouse can be a single data base system or can be multiple databases residing on multiple storage devices located at different locations. Further as will be discussed in more detail below, the database warehouse can also store margin loan securitization ("MLS") data tables which are used in connection with the margin loan securitization process. The data in the data warehouse is accessed and updated by processor system 320.

In practice this processor system 320 can include multiple processors of networked mainframes, servers, and PCs. These processors are programmed to execute operations of the system. As shown in FIG. 2 the specific operations performed by the processors are shown as 330 through 399. The account selector 330 operates to analyze account data in the data warehouse to select accounts as candidates suitable for transfer of the margin loans belonging to a selected brokerage account to the trust. The flag generator 340 operates to analyze account data for the accounts selected by the account selector 330. The flag generator 340 can operate to flag certain accounts selected by the account selector 330. The determination as to which accounts to flag can depend on a number of factors, as discussed in more detail below, but in general the flagging of accounts can be biased such that the flagged selected accounts are representative of the overall portfolio of accounts held by the brokerage company, and ultimately the number of accounts flagged can depend on the desired level of funding.

The securitizer 350 facilitates the transfer of the margin loan balances from the brokerage company to the trust (creates and tracks the securitized portfolio). Specifically, the securitizer can establish a general ledger for the trust, the SPV, and the brokerage company, and track the initial transfers of payments between the SPV, trust, and the brokerage company. Further in some embodiments the securitizer can operate to generate a user interface, so that users of the system 300 can access information for the margin loan securitization process, and manually instruct the system to perform certain operations related to the margin loan securitization process. The general ledger operator 360 updates the general ledger of the trust, the general ledger of the SPV and the general ledger of the brokerage company to reflect the fact that the margin loans for the flagged selected accounts have been transferred from the brokerage company to the trust. The transaction operator 370 analyzes transactions in the flagged selected accounts, and determines if any of these transactions effect the balance of the margin loan belonging to one of the flagged selected accounts. The transaction operator 370 calculates the total margin loan balance belonging to the trust. The margin interest calculator 380 calculates the amount of the interest which is due on a margin loan. The margin interest recalculation processor 385 is a process that is done in addition to transaction processing. If a transaction is processed that needs to have margin interest retroactively adjusted prior to the processing date, this adjusts this margin interest.

The reconciliator 390 determines the trial balance for the trust utilizing customer account data from the data warehouse, and compares the trial balance against the balance for the trust as reflected in the general ledger for the trust. The trial balance summarizes the balances within the customer accounts, which reside within the data warehouse. To the extent that a discrepancy is found between the trial balance and the general ledger, the reconciliator can operate to determine the source of the discrepancy and correct it. The margin loan securitization ("MLS") table operator 391 generates three tables that will display flagging history, transaction history and balance history for accounts with margin loans within the trust. These MLS tables will be used for future reporting and as a reconciliation tool. The sale of margin loans can impact a number of reporting issues. Thus, a report generator 392 operates to analyze data in the data warehouse, and other reports generated in connection with the securitizing of margin loans, and then uses this data to generate financial and regulatory reports. The securities segregator 395 operates to identify securities held in accounts which have been transferred to the trust. All securities held by these flagged accounts will be segregated daily as fully paid and be specifically noted in the brokerage company's stock record system. These securities will not be rehypothecated; thus, they will be unavailable for the brokerage company to use for stock lending or short sale activities.

The flag remover 399 allows for the removal of the flag indicator from specified accounts. This process is automated for closed accounts with a zero balance. This process can also include manually identifying accounts for flag removal, which would meet specified removal criteria. The operation of these different components of the system is further clarified and detailed in connection with FIGS. 3 and 4 which illustrate aspects of the system operation which facilitate the securitization and administration of a margin loans.

In FIG. 3, at 410 account data in the data warehouse is analyzed to select accounts which are candidates for margin loan securitization. These accounts are selected by running reports using data from the data warehouse using defined criteria. At 420 a determination is made as to which of the selected accounts will be flagged. This process can include generating a file identifying all of the selected accounts. The data in this file for the selected accounts is then further analyzed. For accounts which meet the criteria within process 420, the accounts will be flagged. At this point a flagged report is generated 440 identifying all of the flagged selected accounts, and identifying the ending margin loan balance belonging to each of the flagged selected accounts, plus accrued interest for margin loans belonging to the flagged accounts. At 460, the data in the data warehouse is updated. This includes updating the information for each account which has been flagged to indicate that the margin loan has been sold, the amount of the balance at the time of sale and the date on which the loan was sold. In one embodiment the updating of the data in the data warehouse includes the generation of a data warehouse MLS Flag History table 460, which identifies flagged accounts using a flag indicator, and includes data identifying the date on which the account was flagged. As will be discussed in more detail below, this MLS table 460 can also be used to track when a flagged account is unflagged. Another report (accounts not flagged) is also generated 430, which identifies accounts selected at 410, but which are not subsequently flagged in process 420, and this report includes reasons for not flagging the account. Accounts that are not flagged are not stored in the MLS flag history table 460, as only accounts that are flagged are included within this table. Accounting entries 450 must be made for the general ledgers for the brokerage company, the SPV, and the Trust, and these entries should reflect the sale of the margin loan.

Any margin loans for the flagged accounts are then securitized using a securitization process 442 as is described above. Specifically, the flagged accounts are securitized, using a SPV and a trust. This process can include the generation of general ledgers for the SPV, the trust, and the brokerage company, and the transfer of margin loans as described above.

At 470 processing is done for daily transactions. Specifically, transactions in flagged accounts are reviewed and translated into one of a number of categories. The flagged accounts are reviewed for margin loan and cash balances. Any transactions that impact the margin loan balances or create margin loans are categorized using a defined securitized margin loan accounting process, which is discussed in more detail below. Once all daily transactions are applied to each account, the interest on the margin loans for the flagged accounts is calculated 471. This calculation is done on an account by account basis. Once completed, the interest amounts are fed back into the transaction processing 470, as margin interest is the last transaction category in this process. Once transaction processing is complete (including margin interest), transaction amounts are applied daily to the general ledger 450. General ledger entries record transactions between the brokerage company, the SPV and the trust. In connection with the transaction processing a balancing report 472 is generated which is used to verify accounting and establish funding requirements. As part of the transaction processing, two MLS tables in the data warehouse are updated to record transactions (transaction history table) 475 and ending margin loan balances (balance history table) 476 for the flagged accounts.

The information in the MLS transaction history table 475 can include an identification of the account, and data specifying the type of the transaction and the date and amount of the transaction. The information in the MLS balance history table 476 includes an identification of the account, the date, month-to-date-interest, and ending margin balance in the trust.

A margin loan interest recalculation process 480 is run. This process analyzes the account data in the data warehouse and adjusts the accrued margin interest for a customer's flagged account. Results of the adjustment can be reflected in transaction processing. In connection with the processing 480 a margin interest recalculation report 485 is generated which shows the amount of adjustment for each of the flagged accounts. A recalculation balancing report 487 is also generated which shows the impact of the margin loan interest recalculation has on the trust's consolidated margin balance. The recalculation balancing shows the trust's opening balance, the total of the interest adjustment, and the trust's ending balance after the adjustment. A recalculation exception report 486 is also generated, which compares transactions between the account data in the data warehouse and the general ledger, and reconciles them. The MLS transaction history table 475 in the data warehouse is updated to record the adjustment to the margin interest for the flagged accounts. This table is described in more detail below.

At 490 a reconciliation process is executed. This process balances transactions between the account data in the data warehouse and the general ledger, and reconciles them. The general ledger for the brokerage company shows the balances held by the brokerage company, and the general ledger for the trust shows the balances for the trust. The system as discussed in connection with the reconciliation process, refers to the brokerage company's computer system which includes the data warehouse and servers and main frames of the brokerage company. The data stored by the system includes records of the information for all of the accounts held by the brokerage company, and this information is checked against the general ledgers to make sure the information in the general ledgers is consistent with other information in the system, and vice versa. During this process the system, the trial balance and accrued interest are compared to general ledger balances and a reconciliation report 496 is generated which shows points where the system and general ledgers are out of balance. This process also generates an exception report 495 which lists flagged accounts with conditions that may be considered for account flag removal. This is discussed in more detail below.

At 505 data for the flagged accounts is analyzed and reports for securitized margin loans are generated. At 510 regulatory data for flagged accounts are reported for securitized margin loans. This may be a single report or number of reports, and shows the total amount of the margin loans for the broker dealer, SPV, and for the trust.

The system 300 will treat the sale of the margin loans as a sale for GAAP purposes. For regulatory reporting, the brokerage company will likely treat the securitization of margin loans as a financing. As a result, the GAAP financial statements will likely differ from the regulatory financial statements.

Account flag removal 500 occurs automatically for any flagged accounts which are closed with no margin loan. In connection with the unflagging process at 500, certain accounts may be manually identified for criteria which results in unflagging the account. For unflagged accounts, the brokerage company will buy back the margin loans if there is a remaining loan balance. The flag removal report 501 identifies the account, date, total ending balance and reason for removal. If an account is manually requested to be unflagged and process 500 could not unflag an account (for example, the account was never flagged), an "Invalid Accounts—Not Unflagged" report 503 will be generated listing the Account number and reason for not unflagging. Following the unflagging of an account, the general ledgers 450 for the trust and the brokerage company and the securitizer 442 are updated to reflect the unflagged status. This data is also loaded into the MLS flag history table 460 in the data warehouse.

In connection with the above discussion it is helpful to recognize that the brokerage company's internal customer account records will not be separated. In order to properly track and calculate the account equity, pending and settled activity, compliance with initial and maintenance margin requirements, etc., the customer account assets and the sold margin loan need to be tracked in the same system and in the same account. In addition, should a situation arise that creates dual ownership of a margin loan (i.e., part owned by the brokerage company and part owned by the SPV and/or trust), the aggregated loan, regardless of owner, needs to be measured against the customer's account assets.

Within the internal customer account records, the brokerage company will have a special designator on accounts whose loans have been sold to the trust. This designation will allow the brokerage company to account for and report the sold margin loans separately.

Account Selection and Flagging:

The account selection 410 requires the analysis of the accounts relative to a wide range of selection criteria. When preparing to sell a group of margin loans to the trust, the brokerage company needs to choose a group of accounts that will meet its funding needs. The brokerage company will use customer account data from the data warehouse to determine, margin balances, transactional history, cash balances, and customer positions to select suitable accounts. The number of accounts selected will depend on the amount of funding the brokerage company wishes to generate. When choosing accounts, the processor will be programmed to create a representative sample of the margin loan portfolio. The selection criteria will seek to minimize reporting complexity and operational impacts, and comply with rating agency standards.

In one embodiment in order to find an account eligible it must meet the following criteria: accounts must be opened and in good standing; accounts must have a Margin Agreement; accounts should have a margin (debit) balance (although this is not required to be initially selected for margin loan securitization). To minimize complexity, accounts will likely be standard customer brokerage accounts. Accounts for employees of the brokerage company, accounts managed by outside investment advisors, ESOP accounts, and international customer accounts will likely be excluded. The following accounts may also be excluded to minimize complexity and regulatory issues: accounts with restricted securities; new accounts—for example, accounts opened within 2 years; accounts with a new margin balance; accounts with short positions; accounts with the ability to trade options; accounts with less than a certain number of different securities, for example, an account may need 7 different securities in their portfolio to be considered for securitization; accounts with special maintenance requirements; and accounts with Limited Partnerships; accounts in maintenance, for example, have an outstanding margin call or have very low margin equity.

In addition to the above criteria which can be viewed as fixed criteria, there is also other criteria which can vary over time depending on activity in the account. For example, the process may exclude accounts with securities frequently used for stock lending activities; accounts that have securities with high maintenance requirements; and accounts with a high "risk score". Further, certain advantages can be obtained by biasing the flagging process to include accounts holding higher numbers of security numbers, and accounts holding security types (e.g., fixed income and mutual funds) that are not as favorable to securities lending activities.

Overall consideration should be given to the desired composition of the loan pool selected for securitization. One factor is determining the amount or size of the loan pool which the brokerage company would like to securitize. Further, the selected account pool should average a given number of transactions per month/year. Active accounts will ensure adequate turnover (including payments and new loans) on margin balances, thus, providing adequate cashflow for the trust. To ensure adequate diversification, the securitized margin portfolio should be similar to the brokerage company's total portfolio of marginable accounts. For example, customer geographical locations should be widely dispersed (similar to the total portfolio). In the selection process 410, data from the data warehouse is analyzed to determine those accounts which meet the fixed and variable criteria discussed above. Accounts identified using the fixed and variable criteria can be analyzed collectively to determine which accounts should be selected for flagging, such that the resulting flagged accounts will collectively provide for the desired amount of funding, and provide a representative sample of accounts with appropriate diversification.

As discussed above, accounts with margin loans which are to be securitized are flagged in the flagging process 420. The flag is used in order to track and report all account activity which is relevant to the margin loan securitization process. In one embodiment the selected accounts will be flagged into the mainframe computer via a PC upload process. (Such a PC upload process would suitable in an environment where the brokerage company's computer system included main frame networked with a data warehouse. IBM of Armonk N.Y. is a vendor of suitable mainframe computers, and Oracle is vendor of suitable data warehouse software.) The flagging designation will be noted at the account level and carry an effective date.

Within the flagging process 420, before flagging the accounts, the system can double-check the eligibility of the account to have its margin loan sold. This ensures the accounts are valid customer accounts, are opened and in good standing, and have margin agreements. If an account fails to meet any of the system criteria, they will not be flagged and an "Accounts Not Flagged" report 430 will be generated listing the account and the reason for not flagging. If an account meets all of the system criteria, it is flagged in the system to indicate that any margin balance in this account has been sold to the trust.

An account does not have to have a margin (debit) balance to be flagged as a trust account. It is likely that a few accounts will have a margin balance during the selection process 410, but will have activity that clears their margin balance before they are flagged as trust accounts. These accounts can still be flagged as trust accounts. Any future margin balances generated on these accounts can be sold as incremental loans to the trust.

Once an account is flagged in the system, an "Accounts Flagged for the Trust Report" 440 is generated. This report lists the accounts and corresponding margin balance sold to the trust. The margin balance sold includes all accrued margin interest up to the day the account is flagged. The "Accounts Flagged for the Trust Report" 440 is the basis for generating the appropriate accounting entries on the brokerage company's, SPV's, and the trust's general ledgers 450 to reflect the sale of margin loans. This report also indicates the necessary cash movements between the brokerage company and the trust for the sale of the margin loans.

In addition to the "Accounts Flagged for the Trust Report", the MLS flag history table 460, discussed above, in the data warehouse is updated. The MLS flag history table lists the accounts, flag indicator, the date flagged, and the account balance when flagged. This table will be used for, among other things, future reporting, and to track which accounts are flagged at any given time, and to provide a trust flagging history.

The initial set of accounts will be sold on the first day of the transaction. Throughout the program, accounts can be added or removed periodically to increase or decrease the portfolio. In the event that accounts need to be removed from the trust, this system has a process 500, as discussed above, to unflag trust accounts. One example of such a situation is where an account is closed and has a zero balance. Once a list of accounts to be removed is created, a file is generated. The system will look up each account in the file and remove the trust flag. This process also updates the MLS flag history table 460 in the data warehouse. If an account is included in this list which did not have a trust flag, a "Invalid Accounts—Not Unflagged" report 503 will be generated listing the account number and reason for not unflagging.

Once the accounts have been unflagged in the system, a "Trust Account Flag Removal Report" 501 is generated listing the account, the date the flag was removed, the ending margin balance, and reason for removing the account. This data is also loaded into the MLS Fflag history table 460 in the data warehouse.

Where accounts are unflagged, account entries are processed and recorded 450 on the brokerage company's, SPV's and the trust's general ledgers. Since the trust is selling these margin loans balances back to the brokerage company, the appropriate cash movement is, also completed based on the ending balances on the trust "Account Flag Removal Report" 501. It should be noted that accounting true sale regulations (as noted under FASB 125) should be considered in unflagging accounts.

An exception report 495 is also generated which shows accounts with various characteristics that may require removal. It will be apparent that many of the criteria for this exception report are part of the initial account selection process, so one would expect that these accounts would never have been selected for flagging. However, it should be recognized that many characteristics of an account can change over time. Thus, the accounts will be monitored and an exception report 495 will be generated to identify flagged accounts where: accounts closed with a zero balance; active accounts with a zero balance; accounts with short positions; accounts with the ability to trade options; accounts with option positions; restricted accounts; non-retail accounts; employee accounts; accounts with restricted stock; and fraudulent accounts.

The system will also generate other reports which are used to identify other account conditions. For example, the system will generate a "Regulation T Violations" report. A Reg T violation occurs when an account is unable to meet the minimum 50% equity requirement and the Fed margin call remains uncovered even after securities are liquidated. If the violation occurs when an account is initially sold into the trust (i.e., the first time the account is sold), the sale would be reversed. For an already existing account that makes an additional purchase that cannot be covered, the second transaction would need to be sold back to brokerage company. This may result in dual ownership (part in the trust and part in the brokerage company).

Transaction Processing:

The process of transaction processing 470 provides that for each business day, all transactions for accounts with a trust flag are reviewed by the transaction processor. Transactions that impact a customer's cash balance are identified and mapped into one of the following reporting categories: New Loans, Payments, Margin Interest, Write-offs, and Interest Adjustments. These categories are used to generate the appropriate accounting transactions on the brokerage company's, SPV's, and the trust's general ledgers. Each category has a unique set of account entries. Examples of transactions that impact a customer's cash balance are the sale or purchase of a security, cash dividend, cash deposit, cash withdrawal, wire, check, and miscellaneous account fees.

Transactions are only reported in the trust if an account is flagged and has a margin balance. Any time a cash transaction occurs that fully pays down the margin balance, the remaining cash is not applied to the trust and is ignored by the trust's reporting. For example, if an account has a $100 margin loan and the customer liquidates $150 in securities, the system only reflects a $100 payment in the trust.

Therefore, before any reports or accounting transactions are generated, the system must first determine if the flagged account has a margin balance. If a customer's balance changes from a margin balance to a cash balance, or vice versa, only transactions that create or clear the margin balance are reported in the trust. Thus, the transaction processor calculates the margin balance by account as each category is applied to determine if all, a portion or none of the corresponding transactions are to be reported in the trust.

Once the transactions that impact the trust are identified, report processing, general ledger transaction processing, and the appropriate cash movements can take place. A "Daily Balancing Report" 472 is generated which lists the aggregate total of the trust's opening margin loan balance, the daily transactions by category and calculates the ending balance.

The following is a simple example illustrating this type of report:

| Daily Balancing Report | |
|---|---|
| Beginning balance | 100,000 |
| New Loans | 15,000 |
| Payments | (12,000) |
| Margin Interest | 5,000 |
| Write-offs | 0 |
| Adjustments | 0 |
| Ending balance | 108,000 |

Accounting entries are created and posted to brokerage company's, SPV's and the trust's general ledgers 450 based on the categories on the "Daily Balancing Report".

In addition to the "Daily Balance Report", the MLS transaction history table 475 in the data warehouse is updated. This table lists the date, account, category, and amount applied to the trust. This table will be used for future reporting and a reconciliation tool.

It should be noted that the trust is an external entity and will not be consolidated into the brokerage company's financials for accounting and external reporting.

New Loans: In one embodiment, transactions that create or increase a margin loan balance will be categorized as new loans (for example, wires, withdrawals by the customer or the purchase of a security). On the first day the brokerage company sells the total debit balance in the flagged accounts to the trust, the new loan amount is the ending debit balance after all batch processing is complete plus month-to-date interest not yet posted.

Payments: The system will treat all transactions (except write-offs and interest adjustments) that reduce or clear a margin loan balance as a payment (for example, cash deposits by the customer or cash from security liquidations).

Margin Interest: The daily interest charges are calculated by multiplying the daily margin balance by the daily margin interest rate. Interest charges are compounded on a daily basis and accrue to a customer's account each day. Actual interest charges however are only posted monthly to the financials, trial balance and customer statement. In one embodiment the processor will record interest daily to the trust's general ledger.

Margin Interest Recalculation: This is a process that is done in addition to transaction processing. If a transaction is processed that needs to have margin interest retroactively adjusted prior to the processing date, this adjusts this margin interest. The most common example is when a customer deposits a check (which lowers their margin balance). A week later, if the check is returned because of non-sufficient funds (which increases the accounts margin balance), the returned check transaction triggers the margin interest recalculation process to retroactively adjust the accounts margin interest dating back to the initial deposit. If margin interest is adjusted in an account that has a trust flag, a report is generated showing the impact to the trust's margin interest. The "Daily Balancing Report" is also generated showing the impact of the change on the ending balance. Accounting transactions are generated in the trust based on this adjustment. These adjustments are also loaded into the same data warehouse MLS transaction history table 475 as the daily transaction processing.

Short Interest: When a customer shorts a security, the brokerage company lends the security to the customer, as opposed to cash. The customer is required to pay the brokerage company interest on the market value of the short security net of cash. The trust is not entitled to short interest since the trust will not be assuming the obligation for the lent security. Interest on short sales will need to be separated from interest on margin loans and recorded as brokerage company income.

Write-offs: Write-offs can occur for a number of reasons. Write-offs and losses on trust flagged customer loans are expensed directly in the trust (not the brokerage company).

Recoveries: The reporting of recoveries for trust customers is required on a daily and monthly basis. When a recovery is made and the account identified as a trust flagged account, the recovered amount (less any collection agency fees) will be sent to the trust. The appropriate accounting entries will be posted to record the full recover on the trust's general ledger.

Collection Agency Fees: Any fees charged by a collection agency for work done on a flagged account must be recorded in the trust. Manual general ledger transactions can be made on a regular basis (i.e., monthly) to record these fees to the trust. The source of these entries could be a copy of the a monthly collection report provided by the collection agency.

Margin Interest Adjustments: Margin interest adjustments can be due to errors in the system in calculating an individual customer's interest or for customer service gestures. These entries can happen throughout the month (i.e., daily) and are not included in the monthly margin interest. All margin interest adjustments need to be reclassed from the brokerage company's books to the trust's books. All transactions related to margin interest adjustments are posted to a specific code in the data warehouse. Anything posted to this code will be reported in this category.

Cash Application Logic:

Cash application logic for reviewing transactions is part of the transaction processing. The following describes the logic used to assign amounts to each transaction category.

Activity from different transaction categories should not be netted. For example, if an account liquidates positions and then buys into new positions on the same day, each of these transactions will appear as separate items in the "new loan" line and the "payment" line in the "Daily Balancing Report" 472.

The following cash application logic should be used as a means of determining the order in which transactions should be processed.

1) Payments
2) New Loans
3) Write-Offs
4) Margin Interest Adjustments
5) Margin Interest If an account balance changes from a debit balance to a credit balance, or vice versa, only transactions that create or clear the debit should be reported in trust general ledger reports. The example below explains this process. Assume the following transactions occur on the same day:

| | |
|---|---|
| Buy Equities | $100 |
| Sell Equities | $(500) |
| The opening balance that day is: | |
| Loan (already sold to Trust) | $100 |

Using this example, the opening and ending balances are as follows:

| | Cash | Margin |
|---|---|---|
| Opening Balances | Broker $0 | Trust $100 |
| Ending Balances | Broker $300 | Trust $0 |

Since the ending balance in the customer account with the brokerage company is $300 in cash, this balance would be reflected in the brokerage company's financials. Any time a customer account has a cash balance, this balance is shown on the brokerage company's financials. The trust is not entitled to cash that exceeds the margin loan. By accounting for all transactions on a gross basis and using the cash application logic defined above, the daily balancing report for the trust would show the following elements:

| Transactions | O. Bal. | Pmts | New Loans | Write-offs | E. Bal |
|---|---|---|---|---|---|
| Opening Balance | $100 | | | | $100 |
| Sell Equities | | $(100) | | | $— |
| Buy Equities | | | $— | | $— |
| Ending Balance | | | | | $— |

Notice that only a portion of the payment is reflected. While $500 in payments is received by the brokerage company, the "Daily Balancing Report" only shows $100 in payments for the trust. The remaining $400 is reflected in the brokerage company's general ledger. The maximum payment that is reflected for any trust customer is equal to the beginning balance. If the balance starts the day with a credit balance and ends with a credit balance, no transactions are reflected on the balancing report or in the trust general ledger.

In a second example, assume the following transactions occur on the same day:

| | |
|---|---|
| Uses VISA Card | $250 |
| Buys Equitites | $500 |
| Makes Deposit | $(400) |
| The opening balance that day is: | |
| Loan (already sold to Trust) | $600 |

Using this example, the opening and ending balances are as follows:

| | Cash | Margin |
|---|---|---|
| Opening Balances | Broker $0 | Trust $600 |
| Ending Balances | Broker $0 | Trust $950 |

The beginning and ending balance in the customer account with the brokerage company is $0 since this account is not in a cash balance. By accounting for all transactions on a gross basis and using the cash application logic defined above, the "Daily Balancing Report" for the trust would show the following elements:

| Transactions | O. Bal. | Pmts | New Loans | Write-offs | E. Bal |
|---|---|---|---|---|---|
| Opening Balance | $600 | | | | $600 |
| Makes Deposit | | $(400) | | | $200 |
| Uses VISA Card | | | $250 | | $450 |
| Buys Equitites | | | $500 | | $950 |
| Ending Balance | | | | | $950 |

In this example, the payment (deposit) is applied first and the entire $400 is reflected in the trust. Although shown separately above, the two transactions that increase the margin balance will be netted together and recorded as new loans. Taking all transaction into account left an ending margin balance of $950 in the trust.

Customer Securities:

Customer Securities in accounts flagged for the Trust need to be identified in order to be able to report and account for all security positions associated with margin loans in the trust.

The margin agreement, which can be part of a customer agreement, not only grants brokerage company a security interest in the customer securities, it also grants the brokerage company the ability to rehypothecate customer securities when the customer has an outstanding margin loan. Customer securities supporting sold loans will not be rehypothecated by the brokerage company, the SPV or the trust. Hence, all securities supporting sold loans will be segregated as fully paid and be located in a good "possession or control" location as defined under SEC Rule 15c3-3. All securities in an account with a sold loan will be segregated daily as fully paid and be specifically noted in the brokerage company's stock record system.

Figure 4:
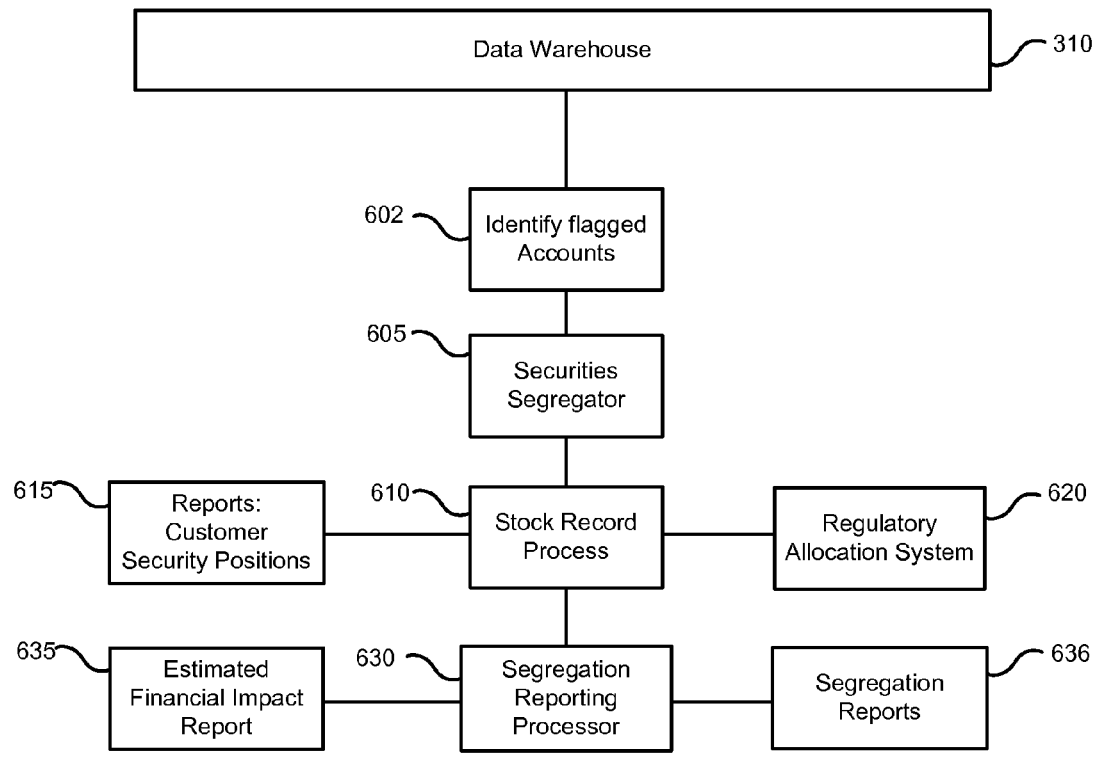
FIG. 4 is a diagram illustrating aspects of the process of segregating securities.

FIG. 4 shows aspects of a securities segregation process 500 used by the securities segregator 395 (FIG. 2) in connection with margin loan securitizaiton. In order to identify accounts transferred to the trust, the securities segregator analyzes 602 a file from the data warehouse to identify flagged accounts with trust flags. The securities segregator 605 operates to identify securities held in accounts which have been transferred to the trust. All securities held by these flagged accounts will be segregated daily as fully paid and will be specifically noted in the brokerage company's stock record system. These securities will not be rehypothecated; thus, they will be unavailable for the brokerage company to use for stock lending or short sale activities. A stock record process 610 tracks where securities are physically located. The "Customer Securities Positions Report" 615 is generated during this process. Customer securities in accounts flagged for the trust are identified in order to be able to report and account for all security positions associated with margin loans in the trust.

A regulatory allocation process 620 is also performed. The allocation process 620 is fed information from the trial balance and stock record process 610 and parses out securities between customer and firm accounts. This information will be used to help prepare various regulatory calculations and reports.

A segregation verification and reporting process 630 is then executed. As part of this process segregation reports are generated 636 that are used to audit customer accounts and securities. Any potential errors are researched and appropriate action is taken to resolve any miscalculations. This report splits out trust related securities, so that these accounts can be accurately tracked.

A report is generated 635 which estimates the financial impact associated with the segregation. By classifying all flagged accounts as fully paid, the brokerage company increases its lock up requirements. Increased requirements may cause the brokerage company to borrow securities more often to satisfy deliver and short sales activities. The financial impact of increased borrowings, increased fails, decreased stock loan and reduced ability to approve client short sale trades will be estimated by this report.

Sample Transaction

The following example illustrates the movement of the customer receivable and cash between each entity over a three-day period. It should be noted that the above reporting and processing methods of the system can be further appreciated by analyzing the cash flow.

On Day 1 Customer A buys $50 of stock and borrows $40 to make the purchase using the current equity (or $110) in his account. All transactions occur on settlement date. O.Bal is the day's opening balance and E.Bal is the day's ending balance. MVL stands for market value long and M.Loan stands for margin loan.

| Customer A - Day 1 | | | |
|---|---|---|---|
| | O. Bal | Buy Security | E. Bal |
| MVL | 100 | 50 | 150 |
| M.Loan | — | (40) | (40) |
| Cash | 10 | (10) | — |
| Equity | 110 | — | 110 |

Figure 5:
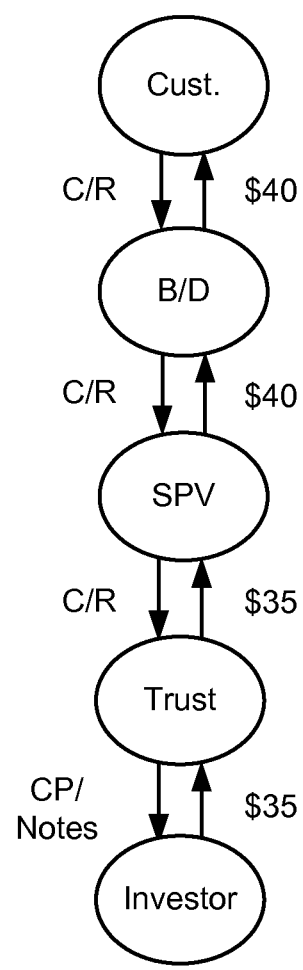
FIG. 5 is a diagram illustrating a simple example of selling a margin loan.

If the brokerage company securitizes this customer receivable (margin loan), the receivable and cash will move between entities as shown in FIG. 5. On the settlement date, the customer receivable (C/R) is sold to the SPV. The brokerage company (B/D) will receive $40 in exchange for the customer receivable. The SPV funds its purchase from its capital and simultaneously sells the customer receivable to the trust. In this example, the trust funds $35 while the SPV funds $5 (split will be at brokerage company's discretion but is subject to accounting and rating agency requirements). In exchange for the customer receivable (valued at $40), the trust remits $35 in cash to the SPV and issues a Transferor Certificate to the SPV valued at $5. The trust has raised the $35 by issuing Series Certificates to external investors (e.g., via commercial paper and/or term note issuance).

The brokerage company's financial statements will record the margin loan made to the customer and the sale of the margin loan (i.e., customer receivable) to the SPV. (Financial statements are shown in a trial balance format; assets are positive and liabilities/equities are negative.)

| Broker Financials - Day 1 | | | | |
|---|---|---|---|---|
| | O. Bal | Cust. Borrows | Sell Loan | E. Bal |
| Cash | 100 | (40) | 40 | 100 |
| Cust. Rec. | — | 40 | (40) | — |

The SPV will record the purchase of the margin loan from the brokerage company and the sale to the trust. The SPV will also record its investment in the trust (shown as the Trust Certificate asset).

The opening balance in the SPV financials assumes that the SPV issued $10 in common stock to the brokerage company and borrowed $30 from the Parent.

| SPV Financials - Day 1 | | | |
|---|---|---|---|
| | O. Bal | Buy/Sell Loans | E. Bal |
| Cash | 40 | (40) 35 | 35 |
| Cust. Rec. | — | 40 (40) | — |
| Trust Certificate | — | 5 | 5 |
| Note to Parent | (30) | — | (30) |
| Com.Stock | (10) | — | (10) |

The trust will record the purchase of the margin loan from the SPV and also record the Certificates it issues to the SPV and external investors.

| Trust Financials - Day 1 | | | |
|---|---|---|---|
| | O. Bal | Issue Funding/ Buy Loans | E. Bal |
| Cash | — | 35 (35) | — |
| Cust. Rec. | — | 40 | 40 |
| Transferor Certificate - SPV | — | (5) | (5) |
| Series Certificate - Ext. Investors | — | (35) | (35) |

Day 2

Figure 6:
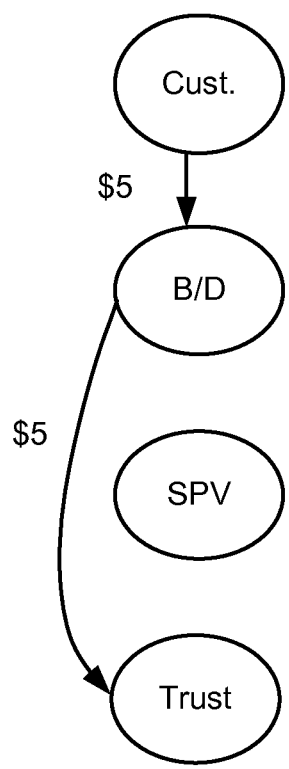
FIG. 6 is a diagram illustrating a simple example of receiving a payment to reduce a margin loan balance.

On Day 2 the customer makes a deposit in a branch office of the brokerage company. As shown in FIG. 6 this deposit does not flow through the SPV. This deposited cash will be remitted to the trust and used to offset against the margin loan.

| Customer A - Day 2 | | | |
|---|---|---|---|
| | O. Bal | Cust Depo | E. Bal |
| MVL | 150 | | 150 |
| M.Loan | (40) | | (35) |
| Cash | | 5 | |
| Equity | 110 | 5 | 115 |

The brokerage company's and the trust's financials will reflect this transaction. The SPV is not impacted by this transaction.

| Broker Financials - Day 2 | | | | |
|---|---|---|---|---|
| | O. Bal | Customer Deposit | Pay Trust | E. Bal |
| Cash | 100 | 5 | (5) | 100 |
| Cust. Rec. | — | — | — | — |
| A/P - Trust | — | (5) | 5 | — |

| Trust Financials - Day 2 | | | |
|---|---|---|---|
| | O. Bal | Receive Cash | E. Bal |
| Cash | — | 5 | 5 |
| Cust. Rec. | 40 | (5) | 35 |
| Transferor Certificate | (5) | — | (5) |
| Series Certificate | (35) | — | (35) |

The $40 in trust Certificates is now backed by both margin loans and cash.

Day 3

If Customer A buys another security on the third day, this "new loan" is originated by the brokerage company and then sold to the trust via the SPV.

| Customer A - Day 3 | | | |
|---|---|---|---|
| | O. Bal | Buy Security | E. Bal |
| MVL | 150 | 20 | 170 |
| M.Loan | (35) | (20) | (55) |
| Cash | — | — | — |
| Equity | 115 | — | 115 |

The brokerage company's records the margin loan and immediately records the sale of the margin loan.

| Broker Financials - Day 3 | | | | |
|---|---|---|---|---|
| | O. Bal | Cust. Borrows | Sell Loan | E. Bal |
| Cash | 100 | (20) | 20 | 100 |
| Cust. Rec. | — | 20 | (20) | — |

The SPV records the purchase and immediate sale of the margin loan. In this example, the trust's funding for the $20 purchase comes from issuing commercial paper.

| SPV Financials - Day 3 | | | | |
|---|---|---|---|---|
| | O. Bal | Buy Loans | Sell Loans | E. Bal |
| Cash | 35 | (20) | 20 | 35 |
| Cust. Rec. | — | 20 | (20) | — |
| Trust Certificate | 5 | | | 5 |
| Note to Parent | (30) | | | (30) |
| Com. Stock | (10) | | | (10) |

The trust records the purchase of the margin loan.

| Trust Financials - Day 3 | | | |
|---|---|---|---|
| | O. Bal | Buy Loans | E. Bal |
| Cash | 5 | | 5 |
| Cust. Rec. | 35 | 20 | 55 |
| Transferor Certificate | (5) | | (5) |
| Series Certificate | (35) | (20) | (55) |

As shown in the Day 3 example, funding can be increased by increasing the amount of customer receivables sold to the trust. Alternatively, funding can be decreased by choosing not to sell new customer receivables to the trust. The brokerage company will not be obligated to sell margin loans.

It should be recognized that a number of variations of the above described embodiments would be obvious to one of skill in the art. Accordingly, although specific embodiments and methods of the present invention are shown and described herein, this invention is not to be limited by these specific embodiments. Rather, the scope of the invention is to be defined by the following claims and their equivalents.

What is claimed is:

1. A system for securitizing margin loans comprising:
   a processor; and
   a storage device in communication with the processor, the storage device having sets of instructions thereon, which when executed by the processor cause the processor to:
   store in a data warehouse data for a plurality of brokerage accounts held by a broker, wherein the data warehouse is operable to receive updated information for each of the brokerage accounts based on account activity,
   analyze with an account selector the account information contained in each of the brokerage accounts to identify a set of the brokerage accounts meeting criteria for performing margin loan securitization,
   flag with a flag generator accounts within the data warehouse identified by the account selector with which to perform margin loan securitization,
   segregate with a securities segregator securities supporting margin loans held in flagged accounts such that the securities cannot be rehypothecated, and
   securitize with a securitizer the margin loans of the flagged accounts, the securitizer configured to initiate a transfer of the margin loans from the broker.

2. The system of claim 1, further causing the processor to update with a ledger operator the broker ledger to reflect the transfer of the margin loans from the broker.

3. The system of claim 1, further causing the processor to generate with a report generator a plurality of reports in connection with the securitization of margin loans, including a report identifying the level of funding produced by the securitization.

4. The system of claim 3, further causing the processor to generate a report indicating accounts flagged.

5. The system of claim 1, wherein the flag generator is configured to receive a second set of criteria useable by the flag generator to analyze the set of accounts selected by the account selector, and to identify a second set of accounts on which to perform margin loan securitization, and to flag each account in the second set of accounts within the data warehouse, wherein the second set of accounts is a subset of the set of accounts selected by the account selector.

6. The system of claim 5, further causing the processor to generate a report indicating accounts selected by the account selector but not flagged by the flag generator.

7. The system of claim 1, wherein the criteria utilized by the account selector for identifying accounts includes that accounts are opened, and accounts are associated with a Margin Agreement.

8. The system of claim 1, further causing the processor to remove flags with a flag remover, wherein the process of removing a flag from an account comprises repurchasing the previously transferred margin loan.

9. The system of claim 1, wherein at least one additional account is added to the flagged list subsequent to the securitization of margin loans such that the margin balance associated with the at least one additional account is transferred from the broker subsequent to the initial securitization.

10. The system of claim 1, further causing the processor to identify with an account monitor whether a sale associated with a brokerage account produces a Regulation T violation, and initiate a reversal of the sale causing the violation.

11. The system of claim 1, further causing the processor to identify with a transaction processor impacting transactions that impact the cash or margin balance of the flagged brokerage accounts, and generate an appropriate accounting transaction based on the impacting transactions.

12. The system of claim 11, wherein the transactions that impact the cash or margin balance of the flagged brokerage accounts include the sale or purchase of a security, a cash dividend, a cash deposit or withdrawal, a wiring transaction, a check transaction, a credit transaction, or account fees.

13. The system of claim 1, wherein the securitization of margin loans by the broker proceeds to a trust through a special purpose vehicle.

14. A non-transitory computer readable medium having sets of instructions stored thereon, which when executed by a processor cause the processor to:
   store data for a plurality of brokerage accounts held by a broker, wherein the data includes updated information for each of the brokerage accounts based on account activity;

analyze the account information contained in each of the brokerage accounts to identify a set of the brokerage accounts meeting criteria for performing margin loan securitization;

flag accounts with which to perform margin loan securitization;

segregate securities supporting margin loans held in flagged accounts such that the securities cannot be rehypothecated; and securitize the margin loans of the flagged accounts, wherein securitizing comprises initiating a transfer of the margin loans from the broker.

\* \* \* \* \*